US011458620B2

(12) United States Patent
Yang (10) Patent No.: US 11,458,620 B2
(45) Date of Patent: Oct. 4, 2022

(54) CORRECTION METHOD AND SYSTEM FOR CONSTRUCTING MODULAR ROBOT AND CONTROL METHOD FOR MODULAR ROBOT

(71) Applicant: Beijing KEYi Technology Co., Ltd., Beijing (CN)

(72) Inventor: Jianbo Yang, Beijing (CN)

(73) Assignee: BEIJING KEYI TECHNOLOGY CO., LTD., Beijing (CN)

( * ) Notice: Subject to any disclaimer, the term of this patent is extended or adjusted under 35 U.S.C. 154(b) by 100 days.

(21) Appl. No.: 16/905,900

(22) Filed: Jun. 18, 2020

(65) Prior Publication Data

US 2020/0391380 A1 Dec. 17, 2020

Related U.S. Application Data

(63) Continuation of application No. PCT/CN2018/121439, filed on Dec. 17, 2018.

(30) Foreign Application Priority Data

Dec. 19, 2017 (CN) .......................... 201711383047.0

(51) Int. Cl.
  *B25J 9/16* (2006.01)
  *B25J 9/00* (2006.01)
  *B25J 9/08* (2006.01)

(52) U.S. Cl.
  CPC ........... *B25J 9/1617* (2013.01); *B25J 9/0009* (2013.01); *B25J 9/08* (2013.01); *B25J 9/1653* (2013.01)

(58) Field of Classification Search
  CPC ..... B25J 9/0009; B25J 9/08; B25J 9/16; B25J 9/1605; B25J 9/1617; B25J 9/1653; B25J 9/1679
  See application file for complete search history.

(56) References Cited

U.S. PATENT DOCUMENTS

6,708,068 B1 * 3/2004 Sakaue ...................... B25J 9/08
                                                          318/568.11
8,851,953 B2 * 10/2014 Oschuetz ............. A63H 33/042
                                                          446/91

(Continued)

FOREIGN PATENT DOCUMENTS

CN         104249368 A     12/2014
CN         104326031 A     2/2015

(Continued)

OTHER PUBLICATIONS

"Research on Bionic Motion Control of Naturally Reconfigurable Robots in Unstructured Environments", Qiao Guifang, Chinese Doctoral Dissertation, Full-text Database Information Technology Series, Jan. 15, 2017.

*Primary Examiner* — Dale Moyer
(74) *Attorney, Agent, or Firm* — Andrew C. Cheng (57) ABSTRACT

The present disclosure relates to the field of modular robot control, and more particularly to a correction method and system for constructing a modular robot thereof. The correction method and system for constructing a modular robot according to the present invention can be corrected according to whether the assembly structure matches the target structure during the assembly of the modular robot, avoiding repeated assembly work by users, Which brings a good user experience to users.

11 Claims, 6 Drawing Sheets

(56) References Cited

U.S. PATENT DOCUMENTS

| | | | |
|---|---|---|---|
| 2003/0040250 A1 | 2/2003 | Yim et al. | |
| 2017/0288976 A1* | 10/2017 | Wang | G06F 3/0486 |
| 2018/0280822 A1* | 10/2018 | Murthy | A63H 33/26 |
| 2018/0353871 A1* | 12/2018 | Oschuetz | B25J 19/0029 |
| 2019/0094841 A1* | 3/2019 | Denayer | G05B 19/41805 |
| 2021/0178575 A1* | 6/2021 | Riek | B25J 9/08 |

FOREIGN PATENT DOCUMENTS

| | | |
|---|---|---|
| CN | 105171720 A | 12/2015 |
| CN | 106272550 A | 1/2017 |
| CN | 108115686 A | 6/2018 |
| CN | 108326847 A | 7/2018 |
| JP | H11109847 A | 4/1999 |

\* cited by examiner

CORRECTION METHOD AND SYSTEM FOR CONSTRUCTING MODULAR ROBOT AND CONTROL METHOD FOR MODULAR ROBOT

TECHNICAL FIELD

The present disclosure relates to the field of modular robot control, and more particularly to a correction method and system for constructing a modular robot thereof.

BACKGROUND

Robots have been widely used in life and industry, e.g., used for training students' creative thinking skills in teaching and used for welding, spraying, assembling, carrying and other operations in automated production. Although as an execution system, a robot has great flexibility to complete different work tasks, an existing robot often has only one main function for specific use purposes and occasions due to fixed freedom degree and configuration and lack of functional scalability and re-configurability. In addition, it is very expensive to develop a specific robot for each field and each application, which severely restricts the popularization and application of robots. Therefore, a reconfigurable robot comes into being.

The reconfigurable robots are usually obtained by combining the main module and multiple basic modules. The appearance and structure of multiple basic modules are the same, and they are all equipped with connecting surfaces to realize the combination. However, the user cannot verify if the combination of modular robots is correct or wrong, which brings a lot of repeat assembly works to the user and results a very poor user experience.

SUMMARY

In view of the above problems, the present disclosure provides a correction method and system for constructing a modular robot thereof.

A technical solution of the present disclosure for solving the technical problems is to provide a correction method for constructing a modular robot, the modular robot having at least two module units, each module unit comprising at least two sub-modules that are movable relative to each other and each sub-module comprising at least one butting portion by which the module units are mutually connected, wherein the correction method for constructing the modular robot comprises the following steps: S1: acquiring configuration information of a target modular robot, wherein the configuration information of the target modular robot comprises one or more of location information, module type information and module quantity information of a plurality of module units in the target modular robot; S2: acquiring configuration information of a currently constructed entity model, wherein the configuration information of the constructed entity model comprises one or more of location information, module type information and module quantity information of one or more of the module units in the constructed entity model; S3: determining whether the constructed entity model matches the target modular robot according to the configuration information of the constructed entity model and the configuration information of the target modular robot; and S4: performing correction according to a matching result.

Preferably, step S4 specifically comprises the following sub-steps: S41: providing different prompts according to different matching results; and S42: performing correction according to the different prompts.

Preferably, a location error is that a butting portion on a supervisor-level single cell body or a main cell body is selected wrongly when a single cell body to be assembled is connected to the supervisor-level single cell body or the main cell body; a virtual connecting face is defined at a connection between the two sub-modules of each module unit, two virtual connecting faces of two of the connected module units of the target modular robot are either in parallel or intersected in direction, and a direction error refers to an error present in the directions of the two virtual connecting faces of the two of the connected module units; and the matching results comprise one or more of a location information error, a module type error and a module quantity error, and the location information error comprises a location error and/or a direction error in type.

Preferably, the prompts are displayed on an overall external form of the module units or on the butting portion where one module unit is connected to another module unit.

Preferably, each butting portion has unique interface identification information; the plurality of module units of the constructed entity model is capable of comprising a plurality of identical or different module units; and acquiring the location information of the plurality of module units of the constructed entity model specifically has recognizing, by a module unit, the interface identification information of the butting portion of an adjacent module unit connected to the module unit, and acquiring the location information of the module unit according to the interface identification information of the butting portion of the adjacent module unit and the interface identification information of the butting portion of the module unit per se for connecting the adjacent module unit.

Preferably, when the plurality of module units comprises a plurality of different module units, the plurality of module units comprises a main cell body and at least one single cell body; the single cell body directly connected to the main cell body is defined as a first-level single cell body; and acquiring the location information of the plurality of module units in the constructed entity model has the following sub-steps: S21: transmitting a signal by the main cell body to the first-level single cell body connected thereto via the butting portion; and S22: receiving the signal and then performing face recognition by the first-level single cell body to obtain the interface identification information of the butting portion where the main cell body transmits the signal, and transmitting the interface identification information of the butting portion where the main cell body transmits the signal together with the interface identification information of the butting information where the first-level single cell body per se receives the signal to the main cell body by the first-level single cell body, so as to obtain the location information of the first-level single cell body.

Preferably, the single cell body connected to the first-level single cell body is defined as a second-level single cell body, and the single cell body connected to an $M^{th}$-level single cell body is defined as a $(M+1)^{th}$-level single cell body, M being an integer greater than or equal to 1; and acquiring the location information of the plurality of module units in the constructed entity model further comprises the following sub-steps: S23: sending a signal to the $(M+1)^{th}$-level single cell body by the $M^{th}$-level single cell body; and S24: receiving the signal and then performing face recognition by the $(M+1)^{th}$-level single cell body to obtain the interface identification information of the butting portion where the $M^{th}$-level single cell body transmits the signal, and transmitting the interface identification information of the butting portion where the $M^{th}$-level single cell body transmits the signal together with the interface identification information of the butting information where the $(M+1)^{th}$-level single cell body per se receives the signal to the main cell body by the $(M+1)^{th}$-level single cell body.

Preferably, when the main cell body or the single cell body sends different electrical signals simultaneously to a plurality of subordinate-level single cell bodies, the plurality of subordinate-level single cell bodies responds to the main cell body with the location information of the subordinate-level single cell bodies in a time-sharing sequence according to the interface identification information of the butting portion where the main cell body or the supervisor-level single cell body sends the different electrical signals; or, when the main cell body or the single cell body sends identical or different electrical signals to a plurality of subordinate-level single cell bodies in a time-sharing sequence, the plurality of subordinate-level single cell bodies responds to the main cell body with the location information of the subordinate-level single cell bodies successively according to a time sequence in which the electrical signals are received.

Preferably, the configuration information of the constructed entity model is acquired immediately after each module unit is assembled, the matching is performed according to the configuration information of the constructed entity model and the configuration information of the target modular robot, and the correction is performed according to the matching result; or, the configuration information of the constructed entity model is acquired in one step after assembling is completed, the matching is performed according to the configuration information of the constructed entity model and the configuration information of the target modular robot, and the correction is performed according to the matching result.

Preferably, under the premise of no location error, four butting portions on the same sub-module are capable of being adjusted by a servo when connecting an adjacent module unit, so as to achieve the configuration information consistent with the target modular robot.

Another technical solution of the present disclosure for solving the technical problems is to provide a correction system for constructing a modular robot, wherein the correction system has: a modular robot comprising at least two module units, wherein each of the module units comprises two sub-modules that are movable relative to each other, and each of the sub-modules comprises at least one butting portion by which the module units are mutually connected; a storage module configured to store configuration information of a target modular robot and configuration information of a constructed entity model, wherein the configuration information of the target modular robot comprises one or more of location information, module type information and module quantity information of a plurality of module units in the target modular robot; and the configuration information of the constructed entity model comprises one or more of location information, module type information and module quantity information of a plurality of module units in the constructed entity model; a matching module configured to determine whether the constructed entity model matches the target modular robot according to the configuration information of the constructed entity model and the configuration information of the target modular robot; and a correction module configured to perform correction according to a matching result.

Preferably, the correction system has a modular robot comprising at least two module units, wherein each of the module units comprises two sub-modules that are movable relative to each other, and each of the sub-modules comprises at least one butting portion by which the module units are mutually connected; and a memory and one or more programs, wherein the one or more programs are stored in the memory, the memory communicates with the module units, and the one or more programs are configured to execute the following step instructions: S1: acquiring configuration information of a target modular robot, wherein the configuration information of the target modular robot comprises one or more of location information, module type information and module quantity information of a plurality of module units in the target modular robot; S2: acquiring configuration information of a currently constructed entity model, wherein the configuration information of the constructed entity model comprises one or more of location information, module type information and module quantity information of a plurality of module units in the constructed entity model; S3: determining whether the constructed entity model matches the target modular robot according to the configuration information of the constructed entity model and the configuration information of the target modular robot; and S4: performing correction according to a matching result.

Preferably, the plurality of module units comprises a main cell body and at least one single cell body; each of the butting portions has unique interface identification information; the single cell body directly connected to the main cell body is defined as a first-level single cell body; and acquiring the location information of the plurality of module units in the constructed entity model comprises the following sub-steps: S21: transmitting a signal by the main cell body to the first-level single cell body connected thereto via the butting portion; and S22: receiving the signal and then performing face recognition by the first-level single cell body to obtain the interface identification information of the butting portion where the main cell body transmits the electrical signal, and transmitting the interface identification information of the butting portion where the main cell body transmits the electrical signal together with the interface identification information of the butting information where the first-level single cell body per se receives the electrical signal to the main cell body by the first-level single cell body, so as to obtain the location information of the first-level single cell body.

When a correction method and system for constructing a modular robot of the present disclosure is compared with the prior art, the modular robot includes at least two module units, each module unit including at least two docking parts. The module units are connected by the respective docking parts. Each docking part has unique interface identification information. The correction method for constructing a modular robot includes the following steps: S1: acquiring configuration information of a target modular robot, wherein the configuration information of the target modular robot comprises one or more of location information, module type information and module quantity information of a plurality of module units in the target modular robot; S2: acquiring configuration information of a currently constructed entity model, wherein the configuration information of the constructed entity model comprises one or more of location information, module type information and module quantity information of one or more of the module units in the constructed entity model; S3: determining whether the constructed entity model matches the target modular robot according to the configuration information of the constructed entity model and the configuration information of the target modular robot; and S4: performing correction according to a matching result.

In addition, different prompts are given according to different error types, which is convenient for users to correct different assembly errors according to different prompts, which further avoids users' repeated assembly work and brings users a better user experience.

In addition, the position of each module unit can be accurately obtained through face recognition in this method, which is simple, and has low hardware requirements. The acquisition of the position ensures that it is possible to correct user operations in real time.

The correction system for constructing a modular robot has the above described advantages.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are only used to explain the present disclosure and are not used to limit the present disclosure.

Embodiment 1

Figure 1:
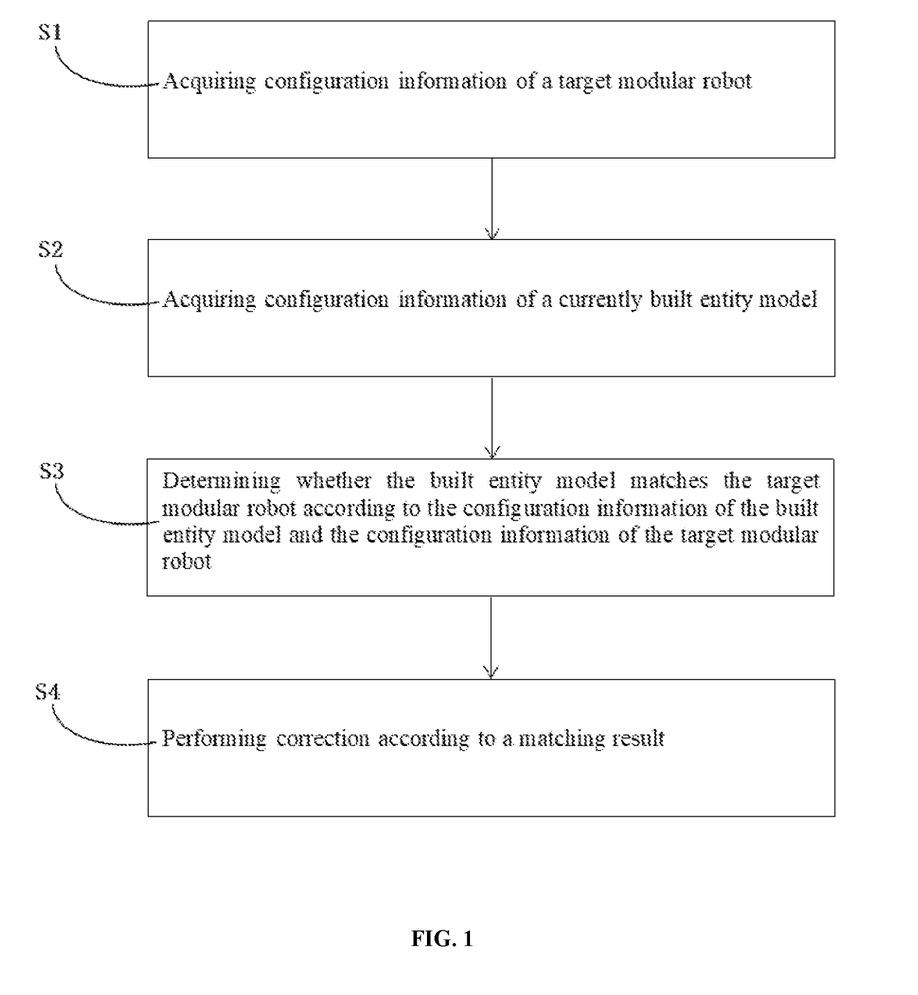
FIG. 1 is a schematic flowchart of a correction method for building a modular robot according to a first embodiment of the present disclosure.

Referring to FIG. 1, a first embodiment of the present disclosure provides a correction method for building a modular robot. The modular robot includes at least two module units, each module unit including two sub-modules that are movable relatively. For example, the two sub-modules are rotatable relatively, especially each module unit being composed of an upper hemisphere and a lower hemisphere that are rotatable relatively. Each sub-module includes at least one docking part, each docking part being provided with an interface, and each interface having unique interface identification information. The module units are connected by the respective docking parts. It may be understood that when each sub-module includes at least two docking parts, the two module units are connected by one docking part of one of the two module units and one docking part of the other of the two module units to form a virtual connection surface at the connection of the two module units. The two module units can rotate based on the virtual connection surface. A plane where at least another docking part on at least one of the two module units is located intersects with the virtual connection surface.

For the sake of the subsequent explanation and understanding, the following definitions are made here. Configuration information includes but is not limited to one or more of module type information, position information, module quantity information, and initial angle information between the two sub-modules. The configuration information is configured to define a connection relationship between adjacent module units. The position information is configured to record interface identification information of the two docking parts by which the adjacent module units are connected, the interface identification information of each docking part representing a position of said docking part on the module unit where it is located. Therefore, the position information of each module unit represents its absolute position in a three-dimensional spatial configuration or planar configuration. Module units of the same type are set with the same module type identifier. For example: cell bodies have the same module type identifier, and single cell bodies have the same module type identifier, the module type identifier of the cell bodies being inconsistent with the module type identifier of the single cell bodies. In the case of a plurality of types of single cell bodies, each type of single cell bodies has the same module type identifier, and different types of single cell bodies have different module type identifiers, such that the module type information of the module units can be obtained by recognizing the module type identifiers. The initial angle information between the two sub-modules refers to a relative angle value between upper and lower sub-modules in each module unit. The module quantity information refers to the quantity of module units. The process of recognizing the interface identification information of the two docking parts by which two adjacent module units are connected to each other between the two adjacent module units refers to a process of face recognition, and the position information of the module units can be obtained by performing the face recognition. It may be understood that the definitions here are also applicable to other embodiments of this specification.

The correction method for building the modular robot includes the following steps:

S1: acquiring configuration information of a target modular robot, the configuration information of the target modular robot including one or more of position information, module type information, and module quantity information of a plurality of module units in the target modular robot;

S2: acquiring configuration information of a currently built entity model, the configuration information of the currently built entity model including one or more of position information, module type information, and module quantity information of a plurality of module units in the currently built entity model;

S3: determining whether the built entity model matches the target modular robot according to the configuration information of the built entity model and the configuration information of the target modular robot; and S4: performing correction according to a matching result.

In the step S1, the configuration information of the target modular robot is derived from a remote terminal, a server or a database in which configuration information corresponding to a plurality of modular robots is stored. The target modular robot is assembled by N module units.

In the step S2, the built entity model is an initial entity configuration that a user intends to assemble a plurality of module units into the target modular robot according to a target configuration of the target modular robot, wherein the initial entity configuration may be an assembled configuration of two or more module units. In general cases, the number of module units of the built entity model is less than or equal to the number N of the module units of the target modular robot. The action of acquiring the configuration information of the built entity model may refer to that a remote terminal acquires position information of each module unit, or one module unit acquires position information of other module units and then transmits the position information to the remote terminal.

Figure 2:
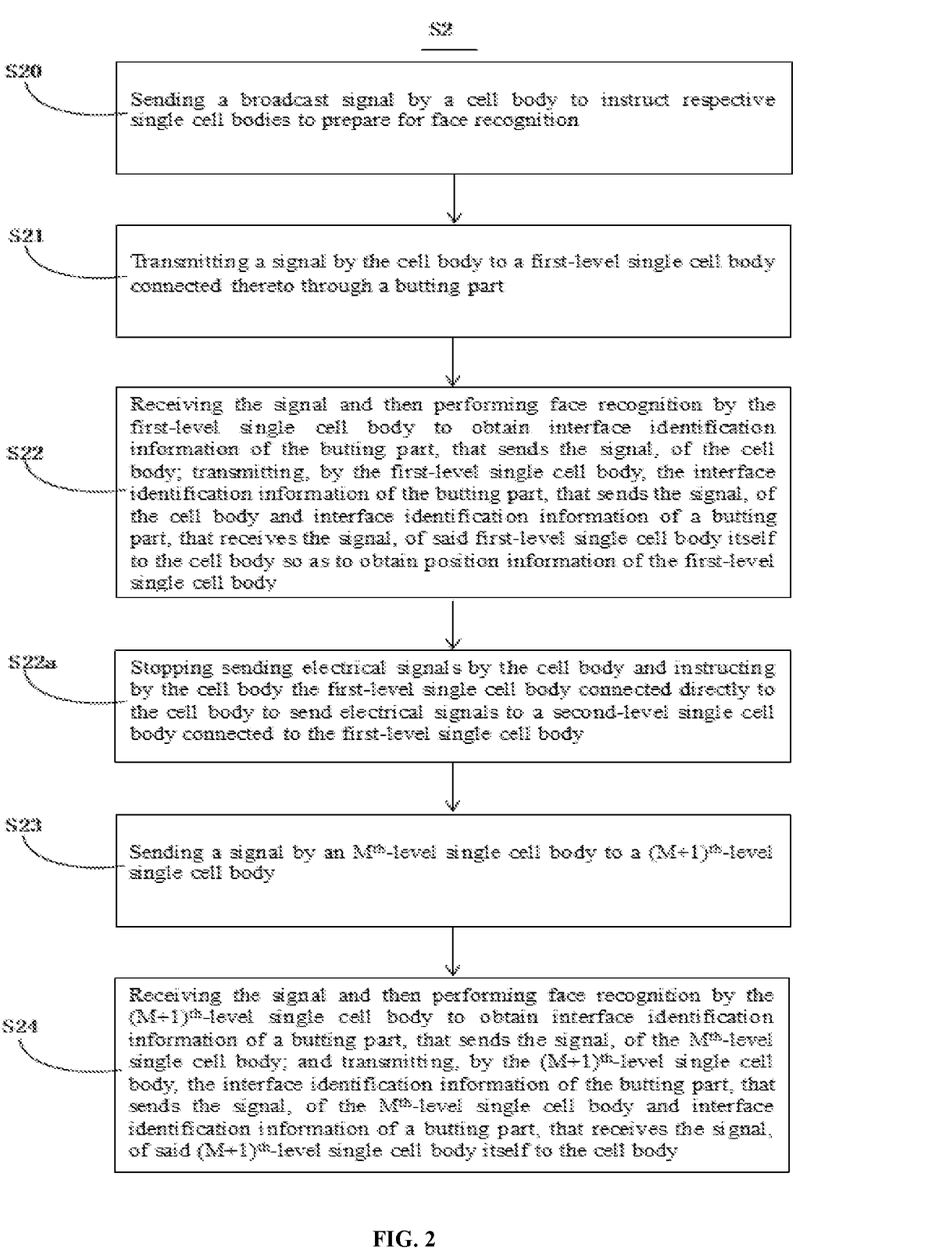
FIG. 2 is a schematic sub-flowchart of step S2 in the correction method for building the modular robot according to the first embodiment of the present disclosure.

Referring to FIG. 2, the plurality of module units of the built entity model may include a plurality of same or different module units. When the plurality of module units of the built entity model includes a plurality of different module units, for example, the plurality of module units of the built entity model includes one cell body and a plurality of single cell bodies, the cell body is configured to communicate with the remote terminal, the single cell body directly connected to the cell body is defined as a first-level single cell body, the single cell body connected to the first-level single cell body is defined as a second-level single cell body, and the single cell body connected to an $M^{th}$-level single cell body is defined as a $(M+1)^{th}$-level single cell body, M being an integer greater than or equal to 1. The configuration information of the built entity model includes module type information, position information and module quantity information. After all single cell bodies transmit their respective position information to the cell body, the cell body obtains the module quantity information of the built entity model. Acquiring the position information of the plurality of module units in the built entity model specifically includes the following steps:

step S21: transmitting a signal by the cell body to the first-level single cell body connected thereto through the docking part;

step S22: receiving the signal and then performing face recognition by the first-level single cell body to obtain the interface identification information of the docking part, that sends a signal, of the cell body; transmitting, by the first-level single cell body, the interface identification information of the docking part, that sends the signal, of the cell body and the interface identification information of the docking part, that receives the signal, of said first-level single cell body itself to the cell body so as to obtain position information of the first-level single cell body;

step S23: sending a signal by the $M^{th}$-level single cell body to the $(M+1)^{th}$-level single cell body; and step S24: receiving the signal and then performing face recognition by the $(M+1)^{th}$-level single cell body to obtain the interface identification information of the docking part, that sends the signal, of the $M^{th}$-level single cell body; and transmitting, by the $(M+1)^{th}$-level single cell body, the interface identification information of the docking part, that sends the signal, of the $M^{th}$-level single cell body and the interface identification information of the docking part, that receives the signal, of said $(M+1)^{th}$-level single cell body itself to the cell body.

It may be understood that the signal transmitted from the cell body to the first-level single cell body and the signal transmitted from the $M^{th}$-level single cell body to the $(M+1)^{th}$-level single cell body are preferably electrical signals or wireless signals. When the plurality of module units of the built entity model includes only the cell body and the first-level single cell bodies, the steps S23 and S24 may be omitted.

When the plurality of module units of the built entity model includes a plurality of same module units, one of the module units is defined as a main module unit, i.e., the above-mentioned cell body; the module unit directly connected to the main module unit is a first-level single cell body, the module unit connected to the first-level single cell body is defined as a second-level single cell body, and the module unit connected to an $M^{th}$-level single cell body is defined as a $(M+1)^{th}$-level single cell body, M being an integer greater than or equal to 1, the above steps S21 to S24 are also performed. As a variant, a plurality of levels of single cell bodies may directly transmit their respective position information to the remote terminal, without having to transmit them to the main module unit.

In summary, the process of acquiring the position information of the plurality of module units of the built entity model is described as follows: each module unit recognizes the interface identification information of the docking part of the adjacent module unit connected thereto, and obtains its position information based on the interface identification information of the docking part of the adjacent module unit and the interface identification information of the docking part by which said module unit itself is connected to the adjacent module unit.

In addition, the following step is performed before or at the same time with step S21:

step S20: sending broadcast signals by the cell body to instruct the respective single cell bodies to prepare for face recognition. It may be understood that wireless communication may be performed between module units. The wireless communication may be wifi communication, Bluetooth communication, or zigbee communication, preferably zigbee communication. The cell body first instructs respective single cell bodies to enter a face recognition preparation state in a form of broadcast signals, and then performs the face recognition action after the respective single cell bodies receive the electrical signals.

In the step S21, each docking part on the cell body sends different electrical signals to a plurality of first-level single cell bodies. In the step S2, the plurality of first-level single cell bodies obtains interface identification information of the docking parts of the cell body connected thereto according to the received different electrical signals. Each first-level single cell body responds to the cell body with the interface identification information of the docking part, that transmits the electrical signals, of the cell body and the interface identification information of the docking part, that receives the electrical signal, of said first-level single cell body itself. The cell body calculates position information of this first-level single cell body through an algorithm. After the plurality of first-level single cell bodies performs the same action, the cell body obtains position information of the plurality of first-level single cell bodies. In the same way, in the steps S23 and S24, each docking part on the $M^{th}$-level single cell body sends different electrical signals to a plurality of $(M+1)^{th}$-level single cell bodies. The plurality of $(M+1)^{th}$-level single cell bodies obtain interface identification information of the docking parts of the $M^{th}$-level cell body connected thereto according to the received different electrical signals. Each $(M+1)^{th}$-level single cell body responds to the cell body with the interface identification information of the docking part, that transmits the electrical signal, of the $M^{th}$-level single cell body and the interface identification information of the docking part, that receives the electrical signal, of the $(M+1)^{th}$-level cell body itself. The cell body calculates the position information of the $(M+1)^{th}$-level single cell body through an algorithm. After the plurality of $(M+1)^{th}$-level single cell bodies perform the same action, the cell body obtains position information of the plurality of $(M+1)^{th}$-level single cell bodies. After a series of face recognition, the cell body obtains the position information of all single cell bodies, thereby obtaining the configuration information of the built entity model.

It may be understand that, when the cell body or single cell body simultaneously sends different electrical signals to a plurality of lower-level single cell bodies, the plurality of lower-level single cell bodies responds to the cell body with their position information based on a time sequence according to the interface identification information of the docking part, that transmits different electrical signals, of the cell body or a higher-level single cell body; or when the cell body or single cell body sends the same or different electrical signals to a plurality of lower-level single cell bodies based on a time sequence, the plurality of lower-single cell bodies sequentially responds to the cell body with their position information according to a time sequence in which the electrical signals are received. For example, when the cell body is provided with two docking parts, the interface identification information is defined as 1 and 2, respectively, and the cell body simultaneously sends two different electrical signals to two first-level single cell bodies connected thereto, it is set that the first-level single cell body connected to a docking part 1 first makes a response with its position information, and after a wait of 10 s (the specific time may be adjusted), the first-level single cell body connected to a docking part 2 makes a response with its position information.

In addition, there is a step between the steps S22 and S23:

step S22a: stopping sending electrical signals by the cell body, and instructing, by the cell body, the first-level single cell body connected directly to the cell body to send electrical signals to the second-level single cell body connected to the first-level single cell body. It may be understood that, in the step S22a, the cell body preferably instructs the first-level single cell body in a form of broadcast signals. It may be understood that before the $M^{th}$-level single cell body sends electrical signals, the cell body controls the $M^{th}$-level single cell body to send electrical signals to a plurality of $(M+1)^{th}$-level single cell bodies based on a time sequence in a form of broadcast signals according to the interface identification information of a plurality of docking parts of the $M^{th}$-level single cell body. The electrical signals sent by the $M^{th}$-level single cell body to the plurality of $(M+1)^{th}$-level single cell bodies may be the same or different, and it is preferable that the plurality of docking parts of the $M^{th}$-level single cell body sends different electrical signals.

In addition, in the steps S22 and S24, after receiving the position information transmitted from the single cell bodies, the cell body individually numbers the respective single cell bodies, and stores the position information of each single cell body in association with the corresponding number. When the cell body communicates with the remote terminal, the cell body transmits the position information of each single cell body and its number to the remote terminal. After the remote terminal sends action control information to the cell body, the cell body decomposes the control information according to different numbers and transmits the decomposed control information to the respective single cell bodies according to the numbers.

In the step S3, determining whether the built entity model matches the target modular robot refers to determining whether the structure of the built entity model is consistent with the structure of the target modular robot, or the structure of the built entity model is a part of the structure of the target modular robot. It may be understood that, in step S4, an error prompt of module type information is obtained according to the matching result. For example, in the configuration information of the target modular robot, two single cell bodies of the same type should be connected to the cell body, but in the configuration information of the built entity model, two different single cell bodies are connected to the cell body. The cell body may determine an error in the module type information by recognizing module type identifiers of the two single cell bodies, and correspondingly give an error prompt, such as highlighting single cell bodies that are assembled incorrectly in a specific color, or giving a prompt that single cell bodies are assembled incorrectly with a specific symbol, or sending a prompt tone indicating that the module type information is incorrect. It may be understood that the error prompt may be displayed through a display interface arranged on the cell body; or displayed on a display interface of the remote terminal connected to the cell body; or displayed throughout the overall shape of the single cell bodies; or displayed on the docking parts by which one single cell body is connected with another single cell body.

Figure 3:
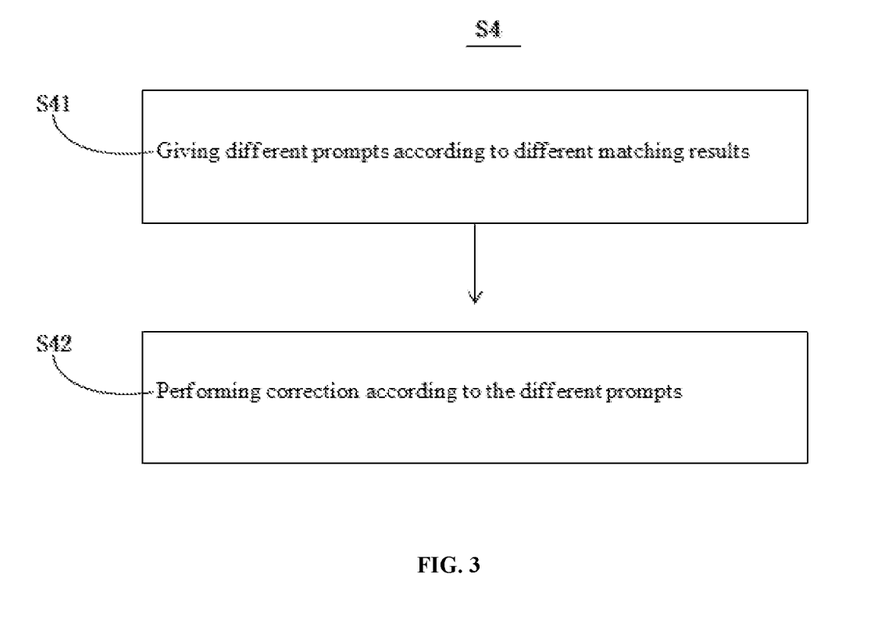
FIG. 3 is a schematic sub-flowchart of step S4 in the correction method for building the modular robot according to the first embodiment of the present disclosure.

Referring to FIG. 3, the step S4 specifically includes the following steps:

S41: giving different prompts according to different matching results; and

S42: performing correction according to the different prompts.

It may be understood that after one module unit is assembled each time, the configuration information of the built entity model is acquired, matched with the configuration information of the target modular robot, and then corrected according to the matching result; or after all the module units are assembled, the configuration information of the built entity model is acquired at one time, matched with the configuration information of the target modular robot, and then corrected according to the matching result.

It may also be understood that a virtual connection surface is present at the connection of two sub-modules in each module unit. The two virtual connection surfaces of the two connected module units of the target modular robot are parallel and intersected in direction. The error types of the position information include a position error and a direction error. For the sake of subsequent description, the two sub-modules in each module unit are defined as a sub-module 1 and a sub-module 2, wherein four docking parts 1, 3, 5, and 7 are provided on the sub-module 1, four docking parts of 2, 4, 6, and 8 are provided on the sub-module 2, and the four docking parts on each of the sub-module 1 and the sub-module 2 are symmetrical. For example, in the case that the existing module unit A and module unit B are connected, in the configuration information of the target modular robot, the module unit B should be connected to the docking part 1 on the module unit A, but in the built entity model, the module unit A is connected to another docking part on the module unit B, thereby causing a position error. For another example, for the existing module unit C and module unit D are connected, in the configuration information of the target modular robot, the docking part 1 of the module unit C should be connected to the docking part 1 of the module unit D, and in this case, a virtual connection surface of the module unit C is parallel to a virtual connection surface of the module unit D, but in the built entity model, the docking part 2 of the module unit C is connected to the docking part 1 of the module unit D, so that the virtual connection surface of the module unit C intersects with the virtual connection surface of the module unit D, thereby causing a direction error. However, as long as the selected docking part of the module unit D is consistent with the configuration information of the target modular robot, and the four docking parts on the module unit C are symmetrical, when the docking part on the module unit D is selected correctly and the module unit C is then connected to the module unit D, the virtual connection surface of the module unit C and the vertical connection surface of the module unit D are parallel or intersected in the case that four docking parts on the same sub-module are connected to the module unit D. Therefore, when the three docking parts 3, 5, and 7 on the module unit C are connected to the docking part 1 on the module unit D respectively, the virtual connection surface of the module unit C and the virtual connection surface of the module unit D are also parallel. Moreover, after the sub-module 1 is adjusted by servo to a certain angle, the configuration information of the built entity model is consistent with the configuration information of the target modular robot. That is, in the case of no position error, when four docking parts on the same sub-module are connected to the adjacent module unit, the sub-module can be adjusted by servo to be consistent with the configuration information of the target modular robot.

In summary, the position error refers to that when a single cell body to be assembled is connected to an upper-level single cell body or a cell body, a selection error is caused when the docking parts on the upper-level single cell body or the cell body are selected. The direction error refers to that the directions of two virtual connection surfaces of the two connected module units in the target modular robot are parallel, while the directions of two virtual connection surfaces of the two correspondingly connected module units in the built entity model are intersected; or the directions of the two virtual connection surfaces of two connected module units in the target modular robot are intersected, while the directions of two virtual connection surfaces of the two correspondingly connected module units in the built entity model are parallel.

Embodiment 2

Figure 4:
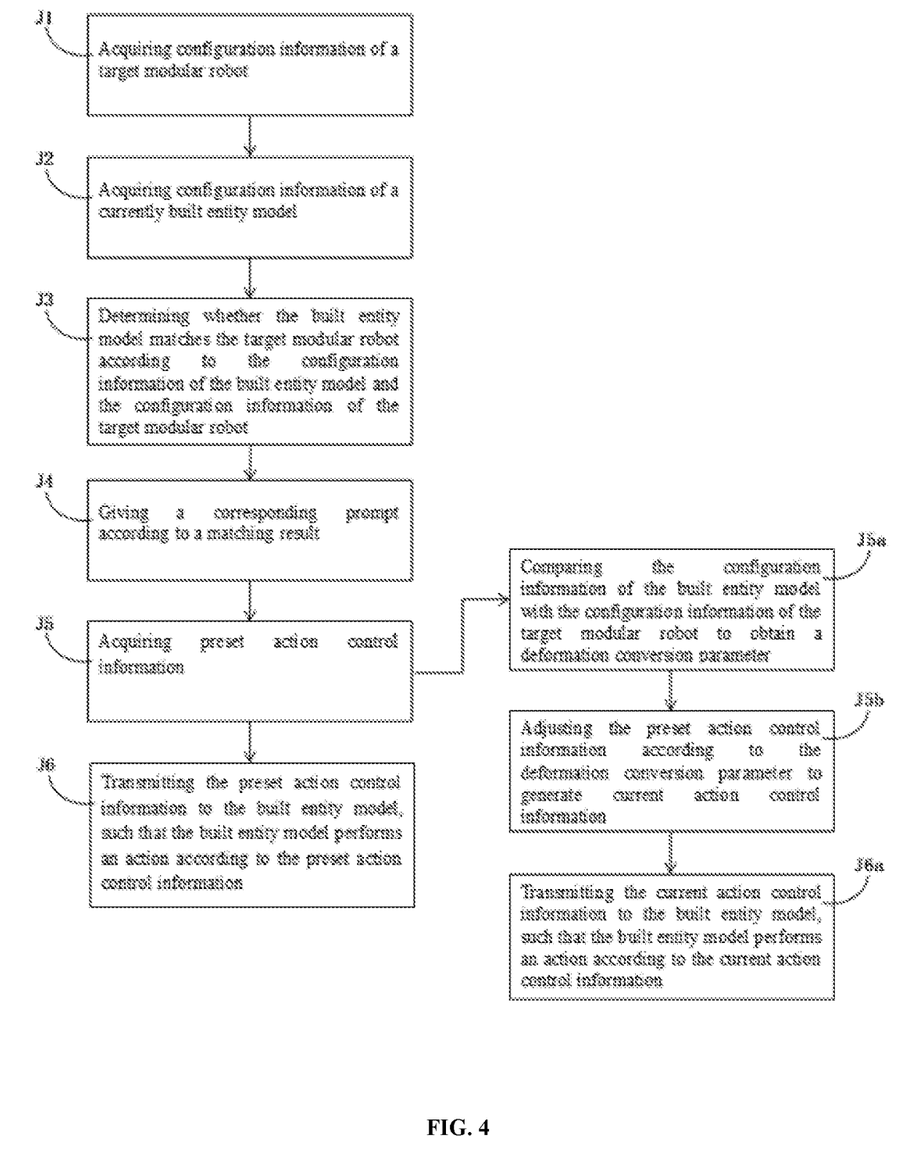
FIG. 4 is a schematic flowchart of a control method for a modular robot according to a second embodiment of the present disclosure.

Referring to FIG. 4, a second embodiment of the present disclosure further provides a control method for a modular robot, which includes the correction method for building the modular robot in the first embodiment. When a matching structure shows that the built entity model is completely consistent with the target modular robot, the control method for the modular robot further includes the following steps:

J5: acquiring preset action control information; and

J6: transmitting the preset action control information to the built entity model, such that the built entity model performs an action according to the preset action control information.

It may be understood that the preset action control information is correspondingly stored in the remote terminal or the cell body according to the configuration information of the target modular robot.

It may be understood that, in the step J6, since the cell body individually numbers the respective single cell bodies after receiving position information transmitted from all single cell bodies, and stores the position information of each single cell body in association with the corresponding number, when the remote terminal transmits the preset action control information to the cell body, the cell body decomposes the preset action control information according to the numbers, and correspondingly transmits a part of the preset action control information to the single cell bodies according to the numbers, and the single cell bodies perform specified actions according to the received part of the preset action control information.

When a configuration of the built entity model is identical with a target configuration of the target modular robot, there may be a case where the docking parts are connected differently. In this case, it will be determined as being result-matched in the correction method for building the modular robot in the first embodiment, but the preset action control information corresponds exactly to the configuration information of the target modular robot, the built entity model may not be able to perform some or all actions according to the preset action control information. Therefore, the following steps may also be performed after step J5:

J5a: comparing the configuration information of the built entity model with the configuration information of the target modular robot to obtain a deformation conversion parameter;

J5b: adjusting the preset action control information according to the deformation conversion parameter to generate current action control information; and J6a: transmitting the current action control information to the built entity model, such that the built entity model performs an action according to the current action control information.

In this case, step J6 is omitted.

Embodiment 3

Figure 5:
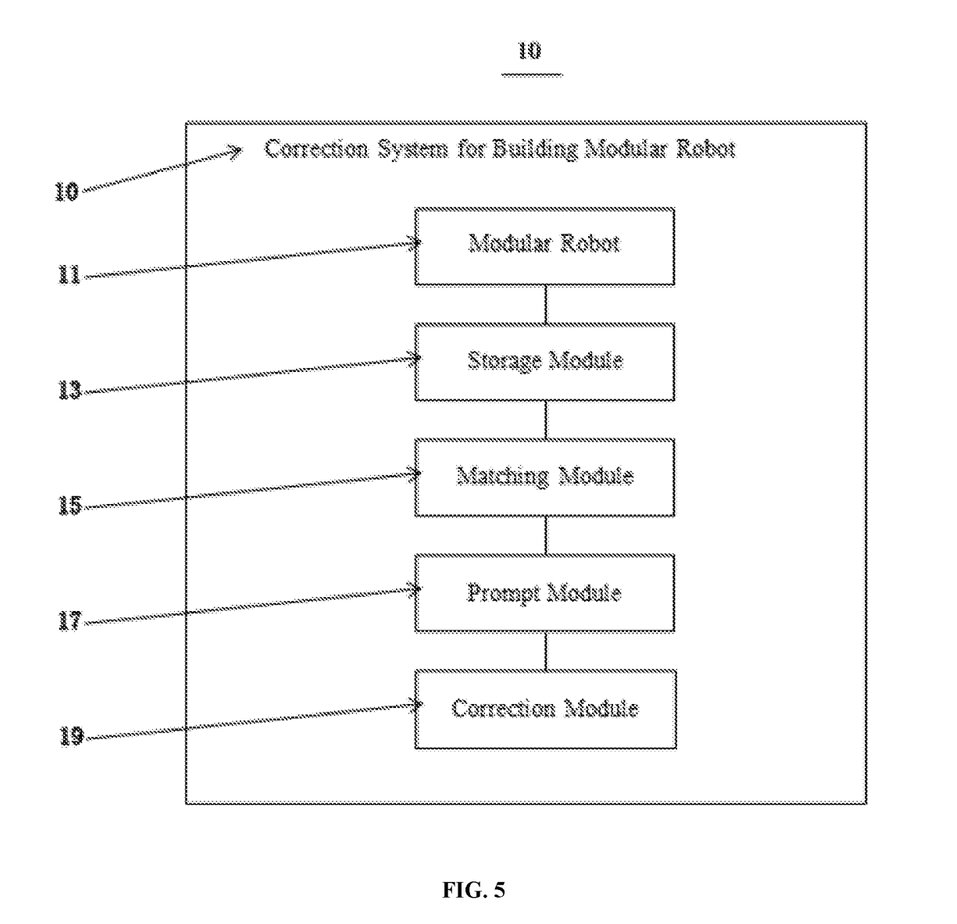
FIG. 5 is a schematic diagram of a module structure of a correction system for building a modular robot according to a third embodiment of the present disclosure.

Referring to FIG. 5, a third embodiment of the present disclosure further provides a correction system 10 for building the modular robot. The correction system 10 for building the modular robot includes:

a modular robot 11, which includes at least two module units, each module unit including two sub-modules that are movable relatively, each sub-module including at least one docking part, and the module units being connected by the docking parts;

a storage module 13 configured to store configuration information of a target modular robot and configuration information of a built entity model, the configuration information of the target modular robot including one or more of position information, module type information, and module quantity information of a plurality of module units in the target modular robot, and the configuration information of the built entity model including one or more of position information, module type information and module quantity information of a plurality of module units in the built entity model;

a matching module 15 configured to determine whether the built entity model matches the target modular robot according to the configuration information of the built entity model and the configuration information of the target modular robot; and a correction module 19 configured to perform correction according to a matching result.

The built entity model is an initial entity configuration that a user intends to assemble a plurality of module units into the target modular robot according to a target configuration of the target modular robot, wherein the modular robot 11 forms the built entity model during an assembly process. The storage module 13 is connected to the modular robot 11 to store the configuration information of the built entity model. The matching module 15 is connected to the storage module 13 to retrieve the configuration information of the built entity model and the configuration information of the target modular robot from the storage module 13. The correction module 19 is connected to the matching module 15 to perform correction according to the matching result given by the matching module 15. It may be understood that the storage module 13 is also configured to be connected with a remote terminal or a server, and acquire the configuration information of the target modular robot from the remote terminal or the server.

In addition, the correction system 10 for building the modular robot further includes a prompt module 17. The prompt module 17 is connected to the matching module 15 and the correction module 19. The prompt module 17 gives different prompts according to different matching results given by the matching module 15. The correction module 19 correspondingly performs correction according to the different prompts given by the prompt module 17.

Embodiment 4

Figure 6:
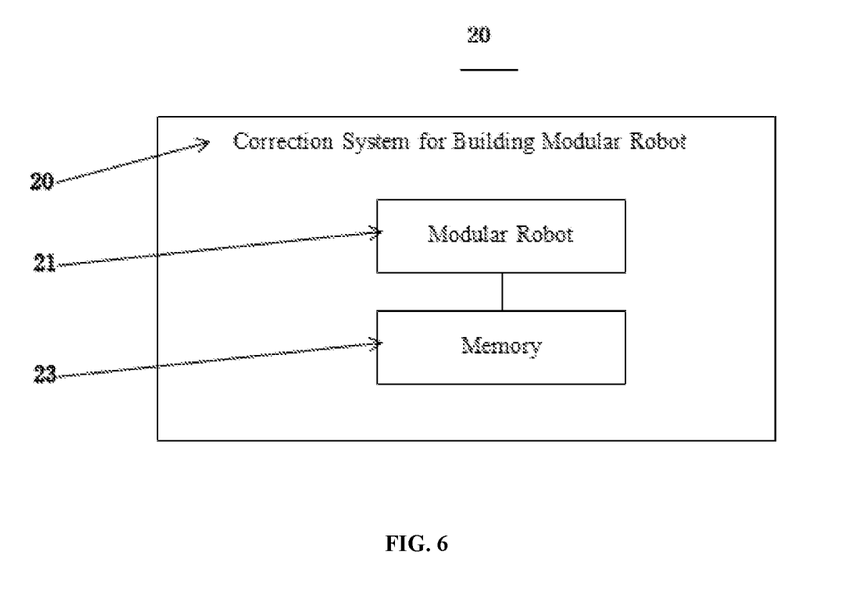
FIG. 6 is a schematic diagram of a module structure of a correction system for building a modular robot according to a fourth embodiment of the present disclosure.

Referring to FIG. 6, a fourth embodiment of the present disclosure further provides a correction system 20 for building a modular robot. The correction system 20 for building the modular robot includes:

a modular robot 21, which includes at least two module units, each module unit including two sub-modules that are movable relatively, each sub-module including at least one docking part, and the module units being connected by the docking parts; and a memory 23, and one or more programs stored in the memory, the memory communicating with the module unit, and the programs being configured to perform the following step instructions:

S1: acquiring configuration information of a target modular robot, the configuration information of the target modular robot including one or more of position information, module type information, and module quantity information of a plurality of module units in the target modular robot;

S2: acquiring configuration information of a currently built entity model, the configuration information of the currently built entity model including one or more of position information, module type information, and module quantity information of a plurality of module units in the currently built entity model;

S3: determining whether the built entity model matches the target modular robot according to the configuration information of the built entity model and the configuration information of the target modular robot; and S4: performing correction according to a matching result.

The built entity model is an initial entity configuration that a user intends to assemble a plurality of module units into the target modular robot according to a target configuration of the target modular robot, wherein the modular robot 11 forms the built entity model during the assembly process. The memory 23 is connected to the modular robot 21 to acquire configuration information of the built entity model.

It may be understood that each of the plurality of module units includes a cell body and at least one single cell body. Each docking part has unique identification information. The single cell body directly connected to the cell body is defined as a first-level single cell body. Acquiring the position information of the plurality of module units in the built entity model in the step S2 includes the following steps:

step S21: transmitting a signal by the cell body to the first-level single cell body connected thereto through the docking part;

step S22: receiving the signal and then performing face recognition by the first-level single cell body to obtain interface identification information of the docking part, that sends the signal, of the cell body; transmitting, by the first-level single cell body, the interface identification information of the docking part, that sends the signal, of the cell body and interface identification information of the docking part, that receives the signal, of said first-level single cell body itself to the cell body so as to obtain position information of the first-level single cell body;

step S23: sending a signal by an $M^{th}$-level single cell body to a $(M+1)^{th}$-level single cell body; and step S24: receiving the signal and then performing face recognition by the $(M+1)^{th}$-level single cell body to obtain interface identification information of the docking part, that sends the signal, of the $M^{th}$-level single cell body; and transmitting, by the $(M+1)^{th}$-level single cell body, the interface identification information of the docking part, that sends the signal, of the $M^{th}$-level single cell body and interface identification information of the docking part, that receives the signal, of said $(M+1)^{th}$-level single cell body itself to the cell body.

It may be understood that when the plurality of module units of the built entity model includes only the cell body and the first-level single cell bodies, the steps S23 and S24 may be omitted.

When the correction method for constructing a modular robot of the present disclosure is compared with the prior art, the modular robot includes at least two module units, each module unit including at least two docking parts. The module units are connected by the respective docking parts. Each docking part has unique interface identification information. The correction method for constructing a modular robot includes the following steps: S1: acquiring configuration information of a target modular robot, wherein the configuration information of the target modular robot comprises one or more of location information, module type information and module quantity information of a plurality of module units in the target modular robot; S2: acquiring configuration information of a currently constructed entity model, wherein the configuration information of the constructed entity model comprises one or more of location information, module type information and module quantity information of one or more of the module units in the constructed entity model; S3: determining whether the constructed entity model matches the target modular robot according to the configuration information of the constructed entity model and the configuration information of the target modular robot; and S4: performing correction according to a matching result.

In addition, different prompts are given according to different error types, which is convenient for users to correct different assembly errors according to different prompts, which further avoids users' repeated assembly work and brings users a better user experience.

In addition, the position of each module unit can be accurately obtained through face recognition in this method, which is simple, and has low hardware requirements. The acquisition of the position ensures that it is possible to correct user operations in real time.

The correction system for constructing a modular robot of the present disclosure also has the above-mentioned advantages.

The foregoing descriptions are merely preferred embodiments of the present disclosure, and are not intended to limit the present disclosure. Within the principles of the present disclosure, any modifications, equivalent substitutions, improvements, etc., are within the protection scope of the present disclosure.

The invention claimed is:

1. A correction method for constructing a modular robot, the modular robot comprising at least two module units, each module unit comprising at least two sub-modules that are movable relative to each other and each sub-module comprising at least one butting portion by which the module units are mutually connected, wherein the correction method for constructing the modular robot comprises the following steps:

S1: acquiring configuration information of a target modular robot, wherein the configuration information of the target modular robot comprises one or more of location information, module type information and module quantity information of a plurality of module units in the target modular robot;

S2: acquiring configuration information of a currently constructed entity model, wherein the configuration information of the constructed entity model comprises one or more of location information, module type information and module quantity information of one or more of the module units in the constructed entity model;

S3: determining whether the constructed entity model matches the target modular robot according to the configuration information of the constructed entity model and the configuration information of the target modular robot; and S4: performing correction according to a matching result; wherein the matching result comprises one or more of a location information error, a module type error and a module quantity error, and the location information error comprises a position error and/or a direction error; the position error referring to that when a single cell body to be assembled is connected to an upper-level single cell body or a cell body, a selection error is caused when the docking parts on the upper-level single cell body or the cell body are selected; a virtual connecting face being defined at a connection between the two sub-modules of each module unit, and two virtual connecting faces of the two connected module units of the target modular robot are in parallel or intersected in direction; a direction error referring to an error present in the directions of the two virtual connecting faces of the two connected module units.

2. The correction method for constructing the modular robot according to claim 1, wherein step S4 specifically comprises the following sub-steps:

S41: providing different prompts according to different matching results; and

S42: performing correction according to the different prompts.

3. The correction method for constructing the modular robot according to claim 2, wherein the prompts are displayed on an overall external form of the module units or on the butting portion where one module unit is connected to another module unit.

4. The correction method for constructing the modular robot according to claim 2, wherein under the premise of no location error, four butting portions on the same sub-module are capable of being adjusted by a servo when connecting an adjacent module unit, so as to achieve the configuration information consistent with the target modular robot.

5. The correction method for constructing a modular robot according to claim 1, wherein each butting portion has unique interface identification information; the plurality of module units of the constructed entity model is capable of comprising a plurality of identical or different module units; and acquiring the location information of the plurality of module units of the constructed entity model specifically comprises:

recognizing, by a module unit, the interface identification information of the butting portion of an adjacent module unit connected to the module unit, and acquiring the location information of the module unit according to the interface identification information of the butting portion of the adjacent module unit and the interface identification information of the butting portion of the module unit per se for connecting the adjacent module unit.

6. The correction method for constructing the modular robot according to claim 5, wherein when the plurality of module units comprises a plurality of different module units, the plurality of module units comprises the cell body and at least one single cell body; the single cell body directly connected to the cell body is defined as a first-level single cell body; and acquiring the location information of the plurality of module units in the constructed entity model comprises the following sub-steps:

S21: transmitting a signal by the cell body to the first-level single cell body connected thereto via the butting portion; and S22: receiving the signal and then performing face recognition by the first-level single cell body to obtain the interface identification information of the butting portion where the cell body transmits the signal, and transmitting the interface identification information of the butting portion where the cell body transmits the signal together with the interface identification information of the butting information where the first-level single cell body per se receives the signal to the cell body by the first-level single cell body, so as to obtain the location information of the first-level single cell body.

7. The correction method for constructing the modular robot according to claim 6, wherein the single cell body connected to the first-level single cell body is defined as a second-level single cell body, and the single cell body connected to an $M^{th}$-level single cell body is defined as a $(M+1)^{th}$-level single cell body, M being an integer greater than or equal to 1; and acquiring the location information of the plurality of module units in the constructed entity model further comprises the following sub-steps:

S23: sending a signal to the $(M+1)^{th}$-level single cell body by the $M^{th}$-level single cell body; and S24: receiving the signal and then performing face recognition by the $(M+1)^{th}$-level single cell body to obtain the interface identification information of the butting portion where the $M^{th}$-level single cell body transmits the signal, and transmitting the interface identification information of the butting portion where the $M^{th}$-level single cell body transmits the signal together with the interface identification information of the butting information where the $(M+1)^{th}$-level single cell body per se receives the signal to the cell body by the $(M+1)^{th}$-level single cell body.

8. The correction method for constructing the modular robot according to claim 7, wherein when the cell body or the single cell body sends different electrical signals simultaneously to a plurality of lower-level single cell bodies, the plurality of lower-level single cell bodies responds to the cell body with the location information of the lower-level single cell bodies in a time-sharing sequence according to the interface identification information of the butting portion where the cell body or the lower-level single cell body sends the different electrical signals; or, when the cell body or the single cell body sends identical or different electrical signals to a plurality of lower-level single cell bodies in a time-sharing sequence, the plurality of lower-level single cell bodies responds to the cell body with the location information of the lower-level single cell bodies successively according to a time sequence in which the electrical signals are received.

9. The correction method for constructing the modular robot according to claim 1, wherein the configuration information of the constructed entity model is acquired immediately after each module unit is assembled, the matching is performed according to the configuration information of the constructed entity model and the configuration information of the target modular robot, and the correction is performed according to the matching result; or, the configuration information of the constructed entity model is acquired in one step after assembling is completed, the matching is performed according to the configuration information of the constructed entity model and the configuration information of the target modular robot, and the correction is performed according to the matching result.

10. A correction system for constructing a modular robot, wherein the correction system comprises:
  a modular robot comprising at least two module units, wherein each of the module units comprises two sub-modules that are movable relative to each other, and each of the sub-modules comprises at least one butting portion by which the module units are mutually connected; and
  a memory and one or more programs, wherein the one or more programs are stored in the memory, the memory communicates with the module units, and the one or more programs are configured to execute the following step instructions:
  S1: acquiring configuration information of a target modular robot, wherein the configuration information of the target modular robot comprises one or more of location information, module type information and module quantity information of a plurality of module units in the target modular robot;
  S2: acquiring configuration information of a currently constructed entity model, wherein the configuration information of the constructed entity model comprises one or more of location information, module type information and module quantity information of a plurality of module units in the constructed entity model;
  S3: determining whether the constructed entity model matches the target modular robot according to the configuration information of the constructed entity model and the configuration information of the target modular robot; and
  S4: performing correction according to a matching result; wherein the matching result comprises one or more of a location information error, a module type error and a module quantity error, and the location information error comprises a position error and/or a direction error; the position error referring to that when a single cell body to be assembled is connected to an upper-level single cell body or a cell body, a selection error is caused when the docking parts on the upper-level single cell body or the cell body are selected; a virtual connecting face being defined at a connection between the two sub-modules of each module unit, and two virtual connecting faces of the two connected module units of the target modular robot are in parallel or intersected in direction; a direction error referring to an error present in the directions of the two virtual connecting faces of the two connected module units.

11. The correction system for constructing the modular robot according to claim 10, wherein the plurality of module units comprises the cell body and at least one single cell body; each of the butting portions has unique interface identification information; the single cell body directly connected to the cell body is defined as a first-level single cell body; and acquiring the location information of the plurality of module units in the constructed entity model comprises the following sub-steps:
  S21: transmitting a signal by the cell body to the first-level single cell body connected thereto via the butting portion; and
  S22: receiving the signal and then performing face recognition by the first-level single cell body to obtain the interface identification information of the butting portion where the cell body transmits the electrical signal, and transmitting the interface identification information of the butting portion where the cell body transmits the electrical signal together with the interface identification information of the butting information where the first-level single cell body per se receives the electrical signal to the cell body by the first-level single cell body, so as to obtain the location information of the first-level single cell body.

* * * * *